(12) United States Patent
Cedervall et al.

(10) Patent No.: US 9,344,682 B2
(45) Date of Patent: May 17, 2016

(54) MULTI-MEDIA MANAGEMENT

(75) Inventors: Mats Cedervall, Härnösand (SE);
Henric Axelsson, Sundsvall (SE); Hans Byström, Sundyberg (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 867 days.

(21) Appl. No.: 12/444,078

(22) PCT Filed: Jun. 4, 2007

(86) PCT No.: PCT/SE2007/000540
§ 371 (c)(1),
(2), (4) Date: Apr. 2, 2009

(87) PCT Pub. No.: WO2008/041896
PCT Pub. Date: Apr. 10, 2008

(65) Prior Publication Data
US 2010/0036964 A1    Feb. 11, 2010

(30) Foreign Application Priority Data

Oct. 2, 2006    (SE) .................................... 0602081

(51) Int. Cl.
*G06F 15/16*    (2006.01)
*G06F 15/173*    (2006.01)
(Continued)

(52) U.S. Cl.
CPC ............. *H04N 7/173* (2013.01); *H04N 21/238* (2013.01); *H04N 21/23439* (2013.01);
(Continued)

(58) Field of Classification Search
CPC ... H04L 29/06; H04L 29/06027; H04L 65/80; H04L 65/403; H04L 65/607; H04L 65/4076; H04L 65/4092; H04L 69/14; H04L 69/32; H04L 69/40; H04L 69/163–69/165; H04L 47/28; H04L 47/283
USPC .......................................... 709/244–253, 231
See application file for complete search history.

(56) References Cited

U.S. PATENT DOCUMENTS 7,706,447 B2 *  4/2010  Karczewicz et al. ...... 375/240.2
8,078,733 B2    12/2011  Astrom et al.
(Continued)

FOREIGN PATENT DOCUMENTS

CN    1799265 A    7/2006
EP    1 675 399 A2    6/2006
(Continued)

OTHER PUBLICATIONS

Boyce, J et al. Fast Efficient Channel Change. Consumer Electronics ICCE 2005 Digest of Technical Repairs. Jan. 2005.

*Primary Examiner* — Farzana Huq
(74) *Attorney, Agent, or Firm* — Patents on Demand, P.A.; Brian K. Buchheit; Scott M. Garrett

(57) ABSTRACT

A multimedia provider multicasts a main multimedia stream comprising a mixture of intra and inter frames and multicasts an associated auxiliary stream comprising intra frames. At least a portion of the intra frames in the auxiliary stream are generated based on same multimedia data as at least a portion of the inter frames of the main stream. The provider also transmits a stream information channel comprising information descriptive of time instances of intra frames in the main and auxiliary streams. This information allows a set top box to selectively connect, in connection with session set-up and channel switch, to the main or auxiliary stream to receive an intra frame with as a low delay as possible.

36 Claims, 7 Drawing Sheets

(51) Int. Cl.

| | |
|---|---|
| *H04N 7/173* | (2011.01) |
| *H04N 21/2343* | (2011.01) |
| *H04N 21/238* | (2011.01) |
| *H04N 21/262* | (2011.01) |
| *H04N 21/438* | (2011.01) |
| *H04N 21/61* | (2011.01) |
| *H04N 21/6405* | (2011.01) |
| *H04L 29/06* | (2006.01) |
| *H04L 29/08* | (2006.01) |
| *H04L 12/841* | (2013.01) |

(52) U.S. Cl.
CPC .... *H04N 21/26275* (2013.01); *H04N 21/4384* (2013.01); *H04N 21/6125* (2013.01); *H04N 21/6405* (2013.01); *H04L 29/06* (2013.01); *H04L 29/06027* (2013.01); *H04L 47/28* (2013.01); *H04L 65/403* (2013.01); *H04L 65/4092* (2013.01); *H04L 65/607* (2013.01); *H04L 69/14* (2013.01); *H04L 69/163* (2013.01); *H04L 69/165* (2013.01); *H04L 69/32* (2013.01)

(56) References Cited

U.S. PATENT DOCUMENTS

| | | | |
|---|---|---|---|
| 2002/0124259 A1* | 9/2002 | Chang et al. | 725/91 |
| 2002/0184373 A1* | 12/2002 | Maes | 709/228 |
| 2003/0236904 A1* | 12/2003 | Walpole et al. | 709/231 |
| 2005/0117055 A1 | 6/2005 | Kerofsky | |
| 2005/0229221 A1 | 10/2005 | Kerofsky et al. | |
| 2006/0020995 A1 | 1/2006 | Opie et al. | |
| 2006/0083263 A1 | 4/2006 | Jagadeesan et al. | |
| 2006/0140276 A1 | 6/2006 | Boyce et al. | |
| 2006/0224762 A1* | 10/2006 | Tian et al. | 709/231 |
| 2007/0005804 A1* | 1/2007 | Rideout | 709/246 |
| 2007/0091789 A1* | 4/2007 | Thukral | 370/216 |
| 2009/0265746 A1* | 10/2009 | Halen et al. | 725/109 |
| 2010/0085868 A1* | 4/2010 | Guo et al. | 370/216 |

FOREIGN PATENT DOCUMENTS

| | | |
|---|---|---|
| WO | WO 00/70876 A1 | 11/2000 |
| WO | WO 2004/114668 A1 | 12/2004 |
| WO | WO 2006/016950 A1 | 2/2006 |
| WO | WO 2006/057938 A2 | 6/2006 |

* cited by examiner

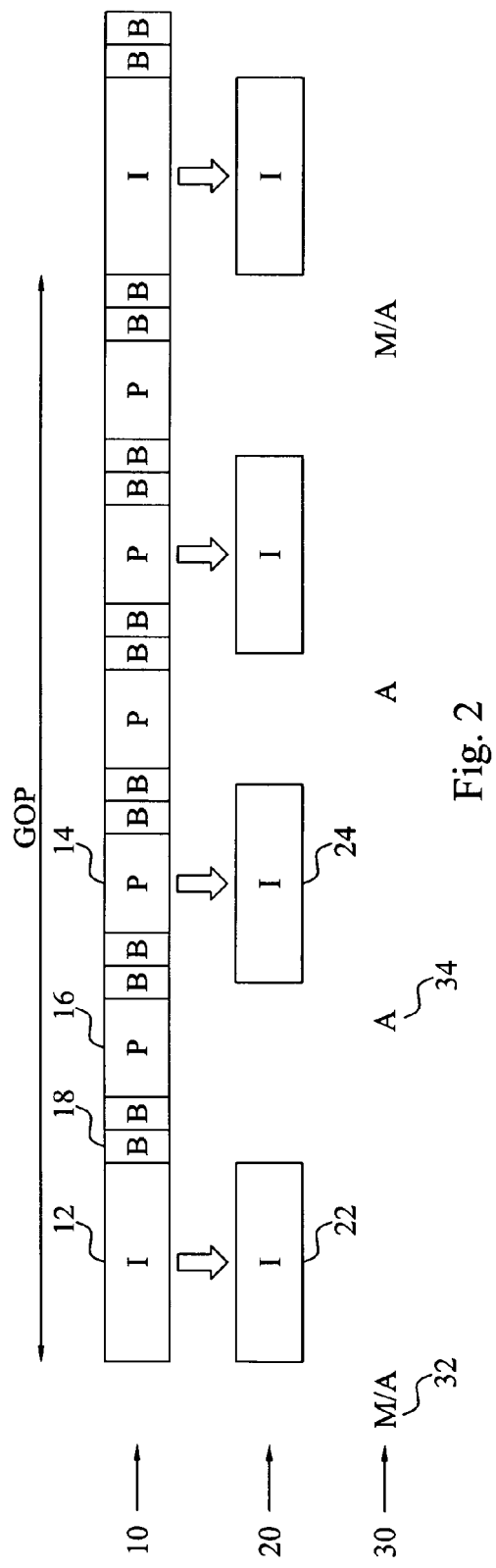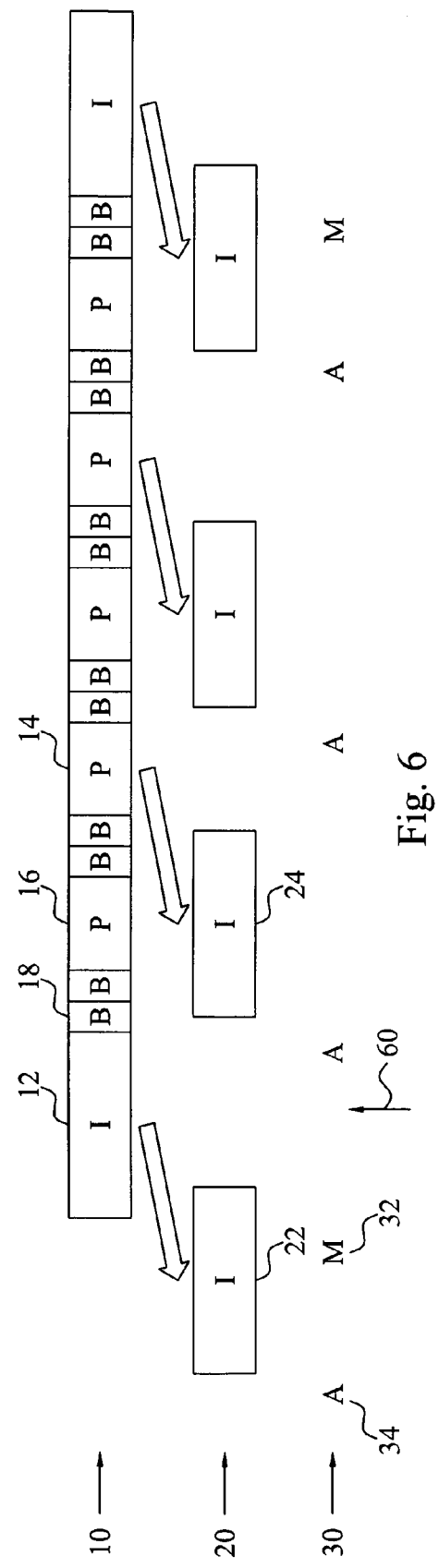

MULTI-MEDIA MANAGEMENT

CLAIM OF PRIORITY

This application is a 371 of International Application No. PCT/SE2007/000540, filed Jun. 4, 2007, which claimed the benefit of priority to Sweden Patent Application No. 0602081-2, filed Oct. 2, 2006. The disclosures of these documents are hereby incorporated herein by reference.

TECHNICAL FIELD

The present invention generally relates to multimedia management, and in particular to techniques reducing a user-perceived time when connecting to a new multicast multimedia channel or switching between multicast multimedia channels.

BACKGROUND

IPTV is a term used when delivering broadcasted TV services over an Internet Protocol (IP) network, typically a broadband access network. The predominant IPTV service is Broadcast TV, in which the normal non-IPTV channels, as well as additional channels with low penetration are transmitted over the broadband network from the super head-end down to the end-user's set top box (STB). In order to minimize the bandwidth required for these transmissions it is suggested to use multicast techniques through the network. When the user switches channel, the STB sends out an Internet Group Management Protocol (IGMP) message to leave the current channel and join a new one.

The multicast group that the STB joins contains streams with Moving Picture Experts Group (MPEG) (normally 2 or 4 part 10) frames. There are different frames in MPEG, so-called intra (I) frames which contain a full picture and inter frames, i.e. P-frames containing incremental extrapolation information and B-frames containing interpolation information. Since the inter frames depend on adjacent frames it is necessary that the STB receives a full intra frame before a new channel can be shown. This means that the average time for switching between channels will depend on the distance in time between intra frames in the multimedia streams. Typically for MPEG-2 the distance is around 0.5 seconds and for MPEG-4 part 10 it can be up to several seconds.

In order to alleviate the problem with channel switching delay, various solutions have been presented.

Omicron [1] describes how to do fast channel switching between MPEG-streams. In their solution, a memory unit is provided in the connection link between the super head-end and the user's STB. This memory unit comprises a set of shift registers that continuously store short sequences of multimedia data of the different available multimedia channels. The lengths of the shift registers are set so that each register always contains at least one intra frame. When a user switches multimedia channel, his/her STB sends a unicast request to the memory unit for the desired new channel and the memory unit fetches the intra frame of that channel stored in one of its shift registers. The fetched intra frame is unicast back to the STB.

One major problem with this type of solution is that in the stream going out of it will be unicast. This means that the switch will either have to be close to, or inside the access node. Otherwise there will be a substantial bandwidth increase in the access network, in particular if several STB users want to switch channels within a same short time interval.

Several documents [2-5] have suggested a solution in which a multimedia stream is input to both a normal decoder for generating a normal multimedia stream and a lower quality encoder for generating a channel change stream comprising lower quality intra frames. A STB is forced to, in connection with a channel switch, to connect to both the normal multimedia stream and the channel change stream. Both streams are processed in parallel in order to identify a first intra frame, either being a normal intra frame of the normal multimedia stream or a lower quality intra frame of the channel change stream. In the former case, the STB simply leaves the channel change stream and continuous to receive the normal stream. However, in the latter case, the STB leaves the channel change stream first once it has received the complete lower quality intra frame and then continuous to receive data of the normal stream. This will cause decoding drift that, in connection with the usage of lower quality intra frames, result in reduced user-perceived quality of the displayed multimedia. In addition, the STB has to perform extensive data management due to the parallel reception and processing of the normal and channel change stream.

SUMMARY

The present invention overcomes these and other drawbacks of the prior art arrangements.

It is a general object of the present invention to provide a multimedia provision in a multicast/broadcast-based network.

It is another object of the invention to provide a multimedia provision that enables a reduction in time of arrival of intra frames following session set-up or channel switch procedures.

These and other objects are met by the invention as defined by the accompanying patent claims.

Briefly, the present invention involves a multimedia provider arranged for multicasting a main multimedia stream comprising a mixture of intra frames and inter frames. The provider also generates at least one associated auxiliary stream for the main stream. In clear contrast to the main stream, this auxiliary stream comprises intra frames, at least a portion of which being generated based on same multimedia data as at least a portion of the inter frames, preferably P inter frames, of the main multimedia stream. Other intra frames of the auxiliary stream may have correspondence to intra frames in the main stream. The auxiliary stream is, thus, a complementary stream to the main stream and only carries multimedia data encoded as intra frames. The main stream and the auxiliary stream are multicast to subscribing users.

The multimedia provider also generates a stream information channel comprising information descriptive of time instances of intra frames in the main multimedia stream and the auxiliary stream. This information channel is also transmitted, preferably multicast, to the subscribing users.

A user terminal, such as set top box, receives, at least in connection with a session set-up and/or a channel switch procedure, the information transmitted on the stream information channel. This information is used by the terminal for selectively connecting to the main multimedia stream or the auxiliary stream. Thus, the information enables the user terminal to determine which of the streams is expected to carry a next intra frame. The terminal connects to that identified stream and receives a complete intra frame. If the identified stream was the auxiliary stream, the user terminal thereafter compiles and transmits a leave request regarding the auxiliary stream and a join request regarding the main stream. The user terminal then continues by receiving inter and intra frames of the main stream.

The selective stream connection of the present invention based on the time instance information from the stream information channel allows the user terminal to connect to the stream that is expected to first provide a complete intra frame without requiring the terminal to simultaneously receive and process data of multiple multimedia streams.

The invention also relates to a set top box, a multimedia provision method and a multimedia session managing method.

SHORT DESCRIPTION OF THE DRAWINGS

The invention together with further objects and advantages thereof, may best be understood by making reference to the following description taken together with the accompanying drawings, in which:

FIG. 1 is a flow diagram illustrating a multimedia provision method according to the present invention;

FIG. 2 schematically illustrates the parallel multicasting of main and auxiliary multimedia streams and a stream information channel according to an embodiment of the present invention;

Figure 9:
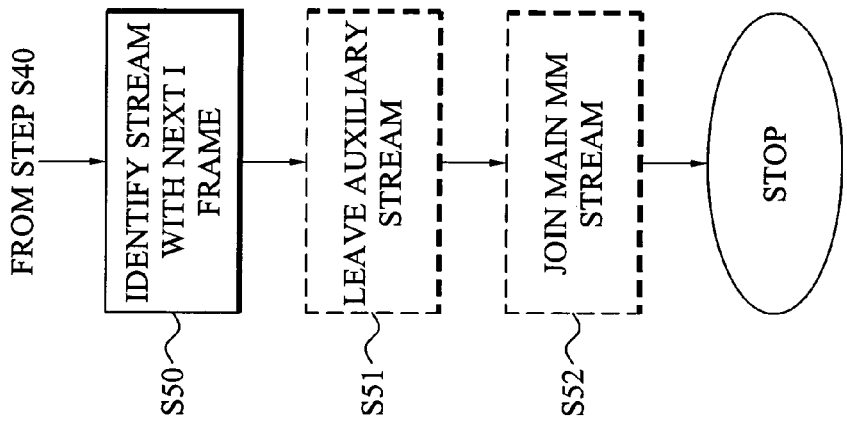
Figure 8:
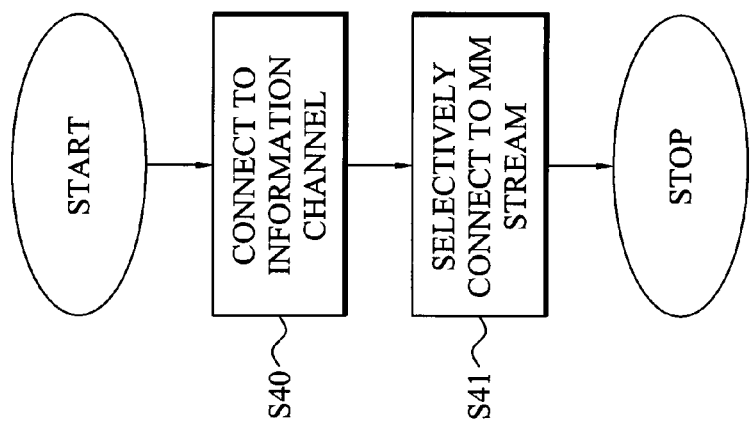
Figure 7:
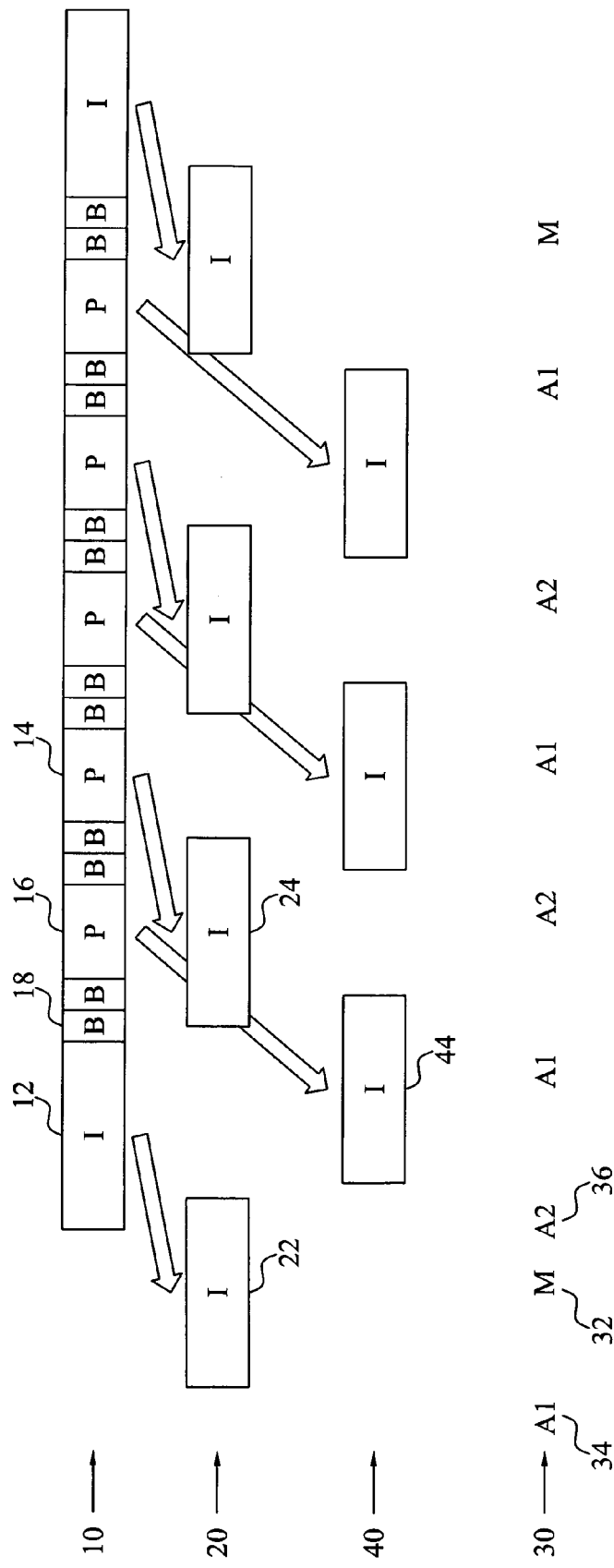
Figure 10:
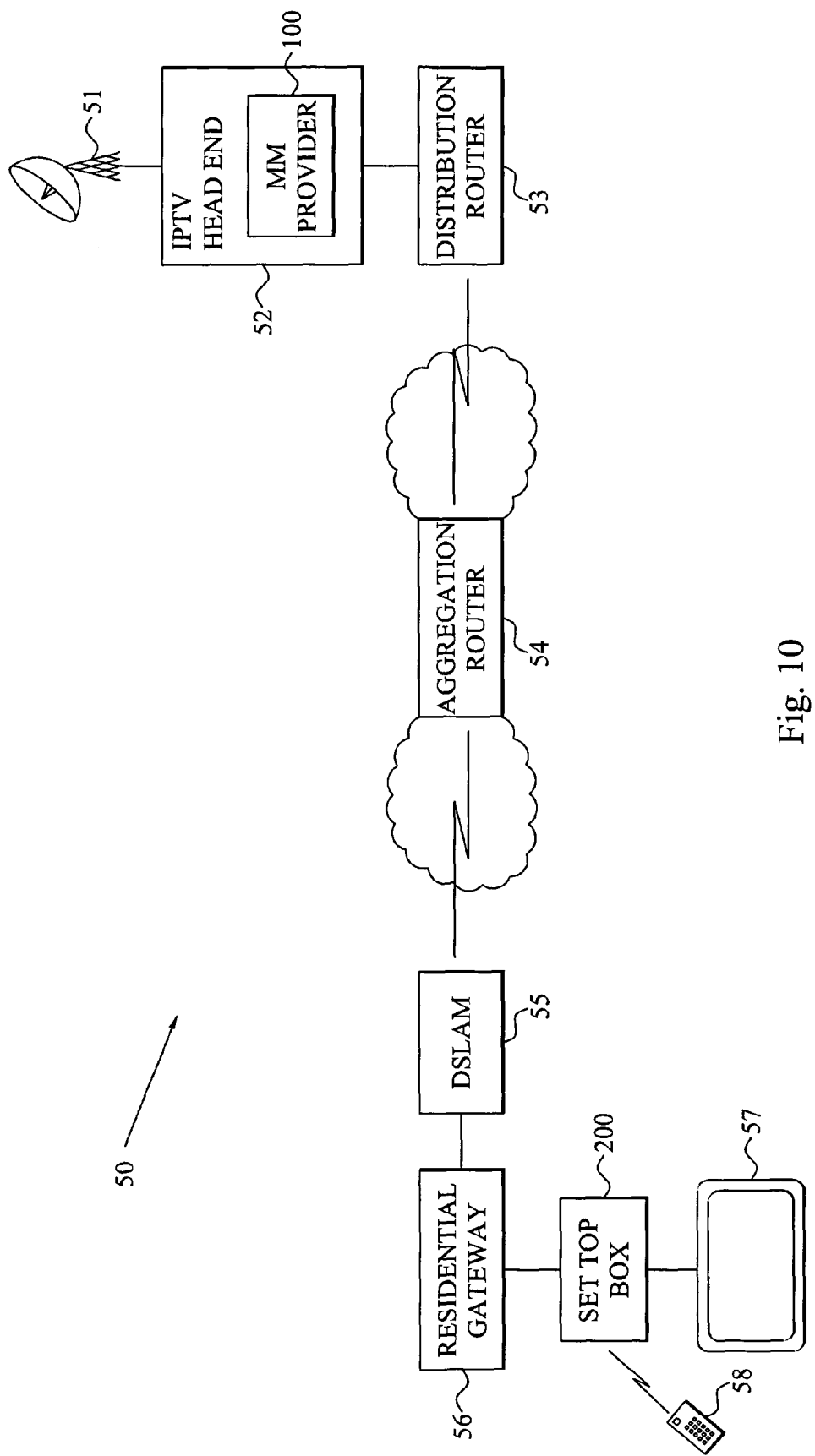
Figure 11:
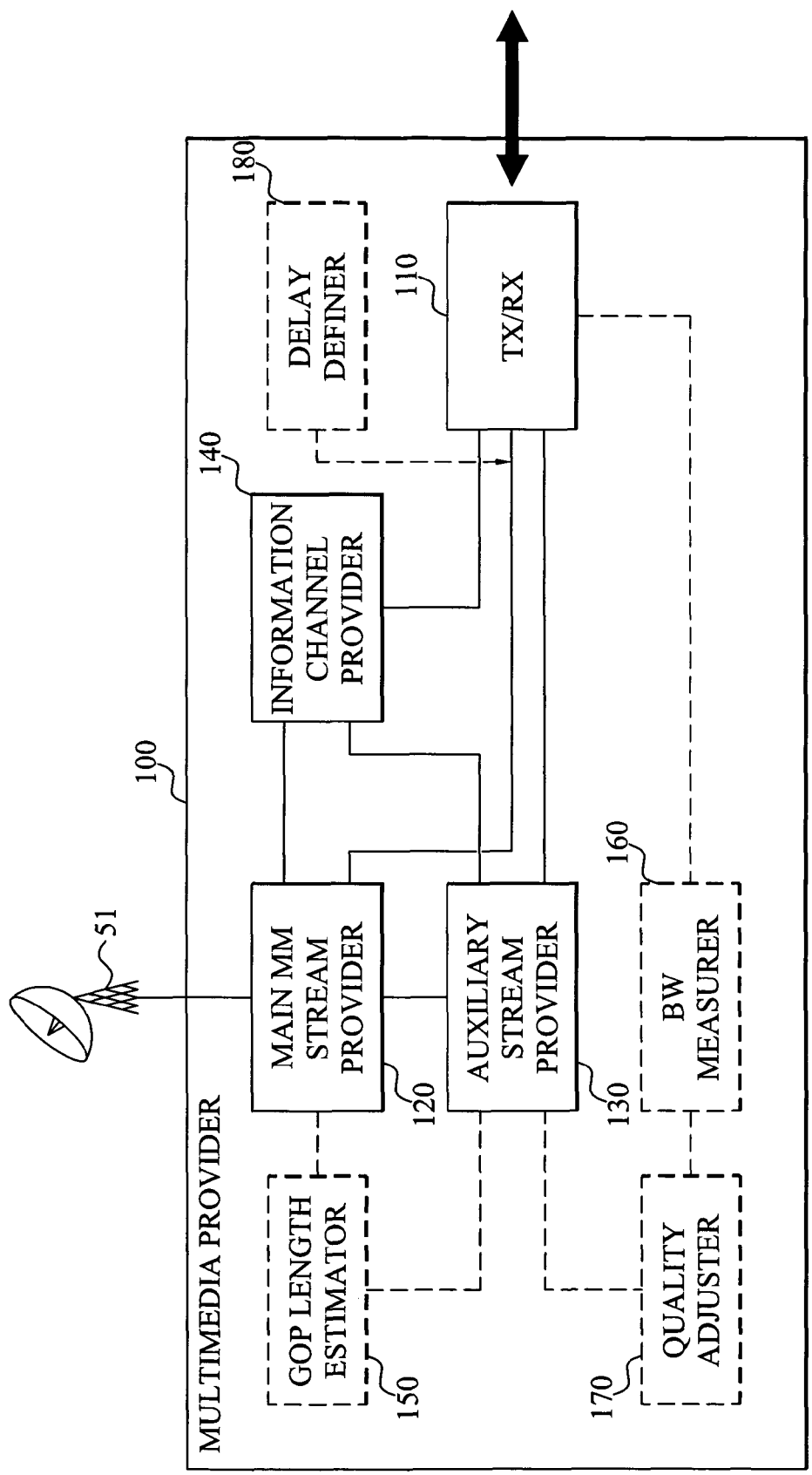
Figures 12, 13:
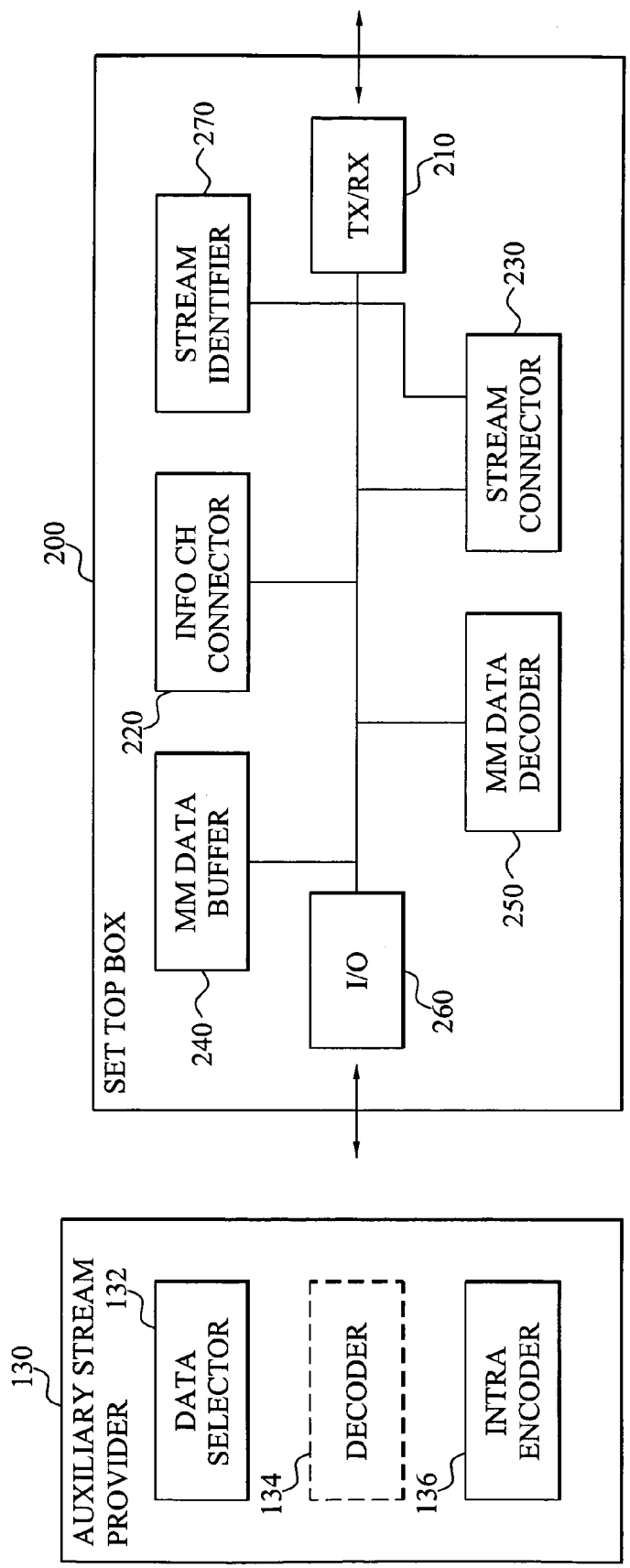

FIG. 6 schematically illustrates the parallel multicasting of main and auxiliary multimedia streams and a stream information channel according to another embodiment of the present invention;

FIG. 7 schematically illustrates the parallel multicasting of main and auxiliary multimedia streams and a stream information channel according to a further embodiment of the present invention;

FIG. 8 is a flow diagram illustrating a multimedia session managing method of the present invention;

FIG. 9 is a flow diagram illustrating the selectively connecting step of FIG. 8 in more detail according to an embodiment of the present invention;

FIG. 10 is a schematic overview of a communication system to which the teachings of the present invention can be applied;

FIG. 11 is a schematic block diagram of a multimedia provider according to the present invention;

FIG. 12 is a schematic block diagram of the auxiliary stream provider of FIG. 11 according to an embodiment of the present invention; and FIG. 13 is a schematic block diagram of a set top box according to the present invention.

DETAILED DESCRIPTION

Throughout the drawings, the same reference characters will be used for corresponding or similar elements.

The present invention generally relates to multimedia provision and multimedia session management in a multicast or broadcast based transmission network. The present invention will in particular enable a reduction in user-perceived delay time in connection with setting up a multimedia session and/or switching between different multicast media channels.

Media or multimedia data according to the present invention includes any form and type of media that can be rendered and displayed at a user terminal. This includes, but is not limited, to images, video, audio and other media types that are capable of being perceived, during rendering, by a user. A media channel according to the present invention is a multicast channel that can, for instance, carry "live" media or consist of pre-recorded content consisting of one or more clips.

Figure 1:
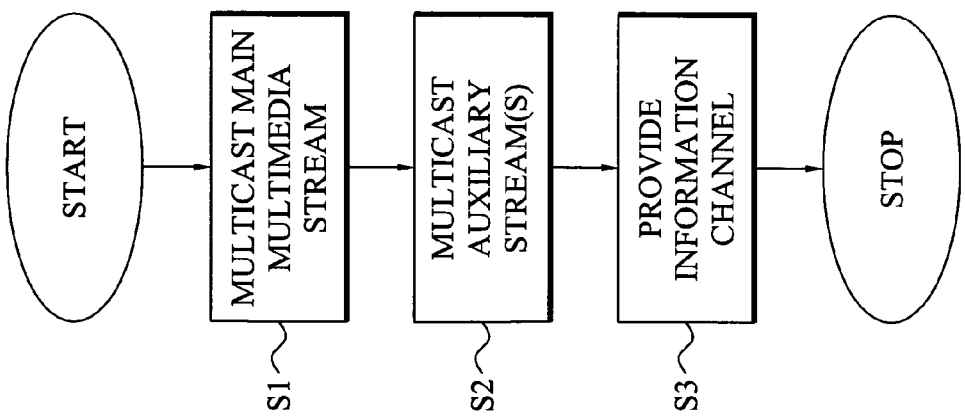

FIG. 1 is a flow diagram illustrating a multimedia provision method according to the present invention. The method starts in step S1 where one or more main multimedia streams representing one or more media channels are multicast to connected clients. As is well known in the art, such a multimedia stream comprises a mixture of intra frames (I frames) and different forms of inter frames, typically denoted P and B inter frames in the art. The intra frames constitute entry points in the stream as they each represent a complete picture. In clear contrast the P and B frames merely carry extrapolation or intrapolation information relating to one or more complete pictures or to other inter frames. Therefore, a decoder of a user terminal or client can only start decoding a received multimedia stream at such an intra frame. There is a trade-off in the usage of intra frames. On one hand it is desirable, from a user point of view, to include many regularly distributed I frames in the stream to reduce the delay time for starting stream decoding at session set-up and channel switch procedures. However, on the other hand, the network operators and service providers are always driving for lowering bit rates, which implies using fewer and more sparsely distributed I frames as the I frames are considerable larger in size as compared to the inter frames.

According to the present invention, the main multimedia stream multicast in step S1 is complemented with at least one associated auxiliary stream comprising intra frames. This intra frame carrying auxiliary stream is then multicast in step S2 to the relevant connected clients. At least a portion of the intra frames in this auxiliary stream are generated based on the same multimedia data as at least a portion of the inter frames of the associated main multimedia stream. Thus, some of the multimedia (raw) data that is encoded into inter frames of the main streams is also encoded as intra frames, for usage in the auxiliary stream. In a preferred embodiment of the invention, selected media portions that represent P inter frames of the main stream are encoded or re-encoded into I frames of the auxiliary stream.

In addition to these intra frames that are generated on the same multimedia data as (P) inter frames of the main multimedia stream, the auxiliary stream may also contain at least a portion of the intra frames of the main stream. In such a case, some of the intra frames in the auxiliary stream will have directly corresponding intra frames in the main stream, whereas remaining intra frames in the auxiliary stream carry multimedia data that is encoded as inter frames in the main stream.

Thus, for each multimedia stream multicast in step S1, one or more auxiliary streams carrying intra frames (but preferably no inter frames) are likewise multicast in step S2. This means that a single multimedia channel will be associated with a main multimedia stream and at least one auxiliary media stream.

A next step S3 of the media provision method provides a so-called stream information channel that is associated with the main multimedia stream and the at least one auxiliary stream. This information channel comprises information descriptive of expected time instances of intra frames in the main stream and its associated auxiliary stream(s). The information channel, thus, functions as an information source that are used by clients for determining in which of the main multimedia stream and the associated auxiliary stream(s) a next intra frame will arrive at client. The information channel may therefore carry a sequence of stream identifiers representative of the main stream or an auxiliary stream.

Each multimedia channel may have one associated information channel. In such a case, the channel identifiers signaled in the information channel can be very simple and short. For example, in the case of only one associated auxiliary stream for a main multimedia stream, the stream identifiers could simply be $0_{bin}$ for the main stream and $1_{bin}$ for the auxiliary stream, or vice versa. If the main stream has more than one associated auxiliary stream, longer, but still very simple, stream identifiers can be used.

In an alternative embodiment, multiple multimedia channels share a single stream information channel. In such a case, the identifiers must be selected so that a user terminal can discriminate between the different main multimedia streams and also being able to determine to which main stream an auxiliary stream is associated.

The stream information channel will, due to the small amount of information transmitted thereon, not constitute a large increase in transmission bandwidth as compared to the main and auxiliary stream. The information channel provision of step S3 could be in the form of unicast transmission to the respective user terminals. However, in order to reduce the bandwidth utilization in the network, the information channel is preferably multicast and more preferably a single information channel is used and multicast for many different multimedia streams available at a media provider.

The method then ends.

FIG. 2 schematically illustrates the parallel multicasting of a main multimedia stream 10, an auxiliary stream 20 and a stream information channel 30 according to an embodiment of the present invention. As is seen in the figure, the main stream comprises a mixture of intra frames 12 and inter frames 14, 16, 18, represented by P frames 14, 16 and B frames 18 in the figure. The I frame 12 and the inter frames 14, 16, 18 following the I frame 12 up to a next I frame in the stream 10 constitute a so-called Group of Pictures or GOP.

The figure clearly illustrates that some of the intra frames 12, preferably all intra frames 12, of the main stream 10 are reused and included as intra frames 22 of the auxiliary stream. However, in order to form a, at least nearly, regular distribution of intra frames 22, 24 in the auxiliary stream with a shorter, preferably significantly shorter, time interval between the intra frames 22, 24 as compared to the associated main stream 10, at least some of the P frames 14 of the main stream 10 are re-encoded into intra frames 24 of the auxiliary stream 20, or the media data of such P frames 14 is encoded as intra frames 24.

It is anticipated by the present invention that the auxiliary stream 20 could comprise one intra frame 24 for each P frame 14, 16 of the main stream 10. However, that would typically result in too large extra bandwidth utilization. As consequence, preferably only a selected portion of the P frames 14 or their multimedia data is used for generating intra frames 24 of the auxiliary frame 20. This then means that some of the P frames 16 of the main stream do not have any corresponding intra frame in the auxiliary stream 20.

The selection of media data portions or P frames 14 to use as a basis for intra frame generation can be pre-defined, such as every $N^{th}$ P frame 14, e.g. every second P frame 14 as in FIG. 2. However, more elaborated selection methods that are at least partly based on available bandwidth levels or GOP lengths can be used according to the invention as is described further herein.

In addition to the main multimedia stream 10 and the associated auxiliary stream 20, the figure also illustrates the stream information channel 30 carrying stream identifiers 32, 34 (M=main stream 10 and A=auxiliary stream 20) indicating time instances of intra frames 12, 22, 24 in the two streams 10, 20.

A user terminal involved in a session set-up procedure or wanting to switch multimedia channel would then connect to, unless already connected thereto, and investigate the stream information channel to determine in which of the main 10 and auxiliary 20 streams a first intra frame 12, 22, 24 is expected to arrive at the terminal. This means that the user terminal does not simultaneously have to be connected to both the main 10 and auxiliary 20 stream and process media packets of the two streams 10, 20 in parallel.

Figure 3:
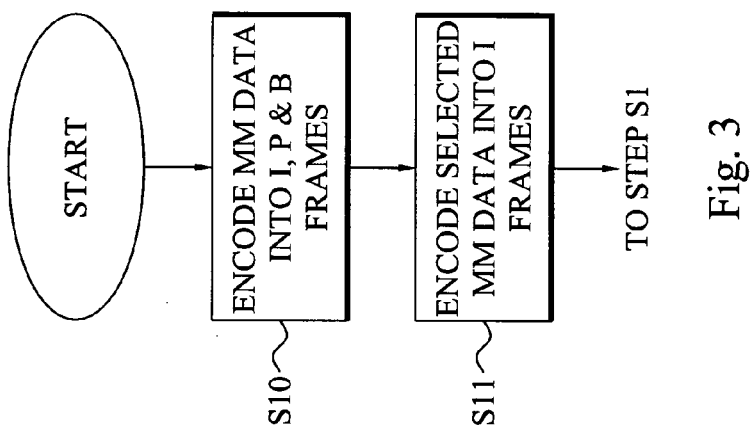
FIG. 3 is a flow diagram illustrating additional steps of the multimedia provision method of FIG. 1.

FIG. 3 is a flow diagram illustrating additional steps of the multimedia provision method of FIG. 1. In these steps, the multimedia data of a media channel is provided, at the media provider, in the form of uncoded media data. A first step S10 encodes the input media data into intra and inter frames to form a main multimedia stream with a selected distribution of intra and inter frames and a defined GOP length. The generation of such a multimedia stream and the selection of intra/inter frame distribution are well-known in the art and are not further described herein.

A next step S11, which can be conducted proceeding, following or in parallel with step S10, encodes selected portions of the input multimedia data into intra frames of the auxiliary stream. These selected portions preferably comprises media portions that where encoded in step S10 into P frames of the main multimedia stream. The two media streams are now available and the method continues to step S1 of FIG. 1.

Figure 4:
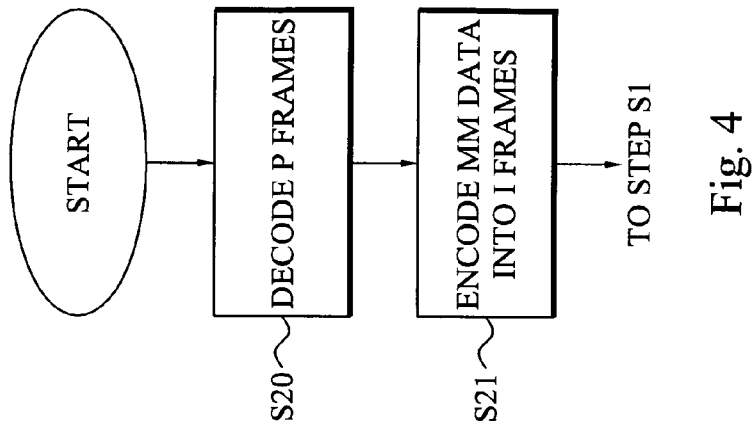
FIG. 4 is a flow diagram illustrating additional steps of the multimedia provision method of FIG. 1.

FIG. 4 illustrates a flow diagram of additional steps of the multimedia provision method shown in FIG. 1. In this embodiment, the media provider receives the main multimedia stream from a media source with a given distribution of intra and inter frames. A first step S20 decodes selected portion of the multimedia stream to form multimedia data. These selected portions are preferably P inter frames of the main stream. A next step S21 encodes the multimedia data from step S20 into intra frames to use in the auxiliary stream. Techniques for re-encoding P frames into I frames are well known in the art. The method then continues to step S1 of FIG. 1.

Figure 5:
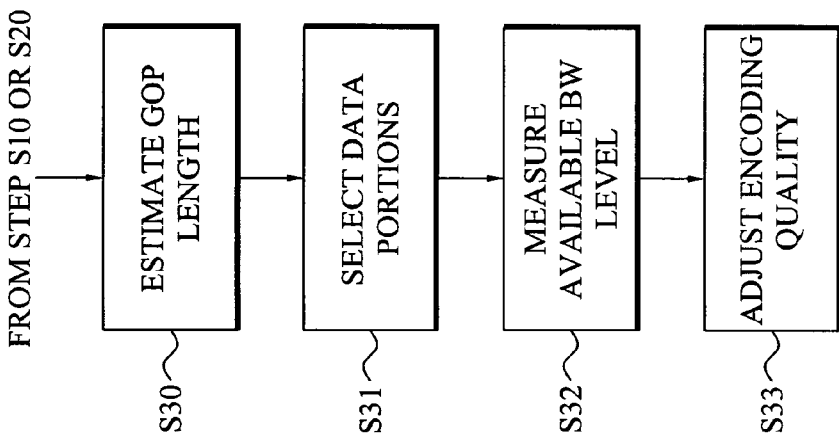
FIG. 5 is a flow diagram illustrating additional steps of the multimedia provision method of FIG. 3 or 4.

FIG. 5 is a flow diagram illustrating additional steps of the multimedia provision method as illustrated in FIG. 3 or 4. The method continues from step S10 of FIG. 3 or step S20 of FIG. 4. In a next step S30, a GOP length of the multimedia stream is estimated. This GOP length of the main stream could be fixed and identical for all main multimedia streams available at a content provider. In such a case, step S30 need only be performed once. However, in a practical implementation, different GOP lengths can be used for different main multimedia streams. In such a case the length estimation of step S30 is preferably performed for each such multimedia stream. In more advanced media provision systems, a variable encoding of the main multimedia stream can be used to thereby dynamically adjust the intra/inter frame distribution and thereby the GOP length. This estimation could be used, for example, based on a current radio quality situation, current available bandwidth levels, current number of simultaneously connected user terminals, etc.

In a next step S31, the estimated GOP length is used to select portions of the input multimedia data to encode as intra frames of the auxiliary stream or to select (P) inter frames of the main stream to re-encode into intra frames of the auxiliary stream. Generally, the longer GOP length as estimated in step S30, the more intra frames should be generated in the auxiliary stream. The selection of step S31 can be conducted based on the GOP length to provide an auxiliary stream with intra frames distributed to achieve a maximum decoder delay goal. For example, a maximum delay of decoding at a user terminal due to awaiting a first intra frame in the main or auxiliary stream when accessing the media channel could be set to be t seconds or milliseconds. Given such a goal and the GOP length, the necessary distribution of intra frames in the auxiliary stream can be defined and thereby the media portions or inter frames to select in step S31 can be identified.

In an alternative approach, the selection of step S31 is performed by selecting P frames of the main stream to re-encode into intra frames of the auxiliary stream. In such a case every $N^{th}$ P frame could be selected in step S31, where this number N is a function of GOP length, i.e. $N=f(length_{GOP})$.

It is anticipated by the present invention that other input parameters than GOP length can be used instead of or as a complement to the GOP length in selecting media portions or inter frames as basis for intra frame generation. Such other possible parameters could be available bandwidth level, the number of simultaneously multicast media channels, etc.

The intra frames of the auxiliary channel could be encoded at a same quality level as the intra frames of the main channel. In such a case, the number of bits spent on an intra frame in the auxiliary stream is generally substantially the same as the number of bits spent on an intra frame in the main multimedia stream.

However, in order to further reduce the bandwidth demand for implementing the auxiliary stream and stream information channel of the present invention, the quality level employed for intra frame encoding of the auxiliary stream can be different, preferably lower, than the corresponding quality level of intra frames in the main stream.

In a further embodiment, the quality level of intra frame encoding for the auxiliary stream can be dynamically adjusted based on a current available bandwidth level. In such a case, the provision method of the invention utilizes the two process steps S32 and S33 of FIG. 5. In step S32 an available bandwidth level is measured, preferably continuously or periodically measured or measured at selected measurement time points. This available bandwidth level is the bandwidth level available for multicasting the main multimedia stream and its associated auxiliary stream(s).

A next step S33 adjusts the encoding quality for the intra frames of the auxiliary stream based on the measured bandwidth level. Generally, for large available bandwidth levels a higher encoding quality can be used, possibly even using a same encoding quality as for intra frames of the main multimedia stream. However, as the bandwidth level reduces, the encoding quality is preferably also reduced, leading to spending fewer bits per intra frame in the auxiliary stream and thereby lowering picture quality when subsequently rendering the frame.

Techniques for dynamically adjusting an encoding quality are well-known in the art and are therefore not described in detail herein.

It is anticipated by the present invention that the provision method of the invention can utilize the process steps S30-S31 of FIG. 5, the process steps S32-S33 of FIG. 5 or the process steps S30-S33 of FIG. 5.

As is known in the art, intra frame packets are much larger than the inter frames, even when using reasonable quality level reductions for intra frame encoding of the auxiliary stream. If the main multimedia stream and the auxiliary stream are transmitted synchrony as illustrated in FIG. 2, it is highly likely that the P frame in the main stream following a received intra frame in the auxiliary stream will already have passed in time when the main stream is joined. The present invention solves this problem by delaying the main stream relative the auxiliary stream.

FIG. 6 schematically illustrates this situation. As compared to FIG. 2, the main multimedia stream 10 is now multicast with a defined time delay relative the auxiliary stream 20. This relative time delay is preferably selected so that a P frame 14 of the main multimedia channel 10 can be received by a user terminal after reception of an intra frame 24 of the auxiliary stream 20, where the P frame 14 and the intra frame 24 are based on same multimedia data. Thus, it is then possible for a user terminal to first connect to the auxiliary stream 20, as selected based on the stream information channel 30, at a time instant represented by the arrow 60 in the figure. The user terminal then receives the first intra frame 24 of the auxiliary stream and, due to the provided time delay between the two streams 10, 20, is able to join the main stream 10 in time for receiving the next P frame 14 of the main stream 10. Thus, the delay is preferably selected so that a next P frame 14 of the main stream 10 is received after the trailing end of the previous corresponding I frame 24 of the auxiliary stream 20.

As was mentioned above, the size of intra frames are considerably larger than the B and P frames. This means that it is usually not possible to have an intra frame in the auxiliary stream corresponding to every P frame of the main stream without having a bandwidth for the auxiliary stream that exceeds the bandwidth of the main stream. This would then introduce an extra channel delay. Even by using a lower encoding quality for intra frames in the auxiliary stream it is generally not possible to have a 1:1 correspondence between intra frames in the auxiliary stream and P frames in the main stream.

In order to increase the number of P frames that have intra frame correspondences without the extra delay, it is possible to use multiple, i.e. at least two, auxiliary streams for a given main multimedia stream. FIG. 7 illustrates this solution in the case of two auxiliary streams 20, 40. A first auxiliary stream 20 has a first time-distribution of intra frames 22, 24, where some of these intra frames 22 could correspond to intra frames 12 of the main stream 10 while other intra frames 24 are generated based on same multimedia data as a first portion of (P) inter frames 14 of the main stream 10. Correspondingly, the second auxiliary stream 40 has a second, different time-distribution of intra frames 44, of which at least a portion are generated based on same multimedia data as a second portion (P) of inter frames 16 of the main stream 10. In the figure, the first auxiliary stream 20 comprises the intra frames 22 of the main stream 10 and an intra frame 24 for every second P frame 14 of the main stream 20. The second auxiliary stream 40 then comprises intra frames 44 corresponding to the remaining P frames 16 in the main stream 10. It is though anticipated by the present invention that even by using multiple auxiliary streams 20, 40 not all P frames in the main stream 10 must necessarily have a corresponding intra frame in one of the auxiliary streams 20, 40.

The stream information channel 30 carries information, i.e. stream identifiers 32, 34, 36, descriptive of time instances of intra frames 12, 22, 24, 44 in the main stream 10 and the multiple auxiliary streams 20, 40. A user terminal can then use this information for selecting in which of the available streams 10, 20, 40 a next intra frame 12, 22, 24, 44 will come and thereby first connect to that stream 10, 20, 40 in connection with a session set-up or channel switch procedure to reduce the delay before multimedia can be rendered.

FIG. 7 also illustrates the preferred usage of time delays between the auxiliary streams 20, 40 and the main multimedia stream 10 previously described. In such a case, the relative time delays between the different streams 10, 20, 40 are selected so that it is possible to receive a complete intra frame 24, 44 of an auxiliary stream 20, 40 and switch to the main stream 10 to receive the corresponding P frame 14, 16.

The teachings described above in connection with FIG. 7 can of course be applied mutatis mutandis to a situation where more than two auxiliary streams 20, 40 are associated with a given main multimedia stream 10.

As was mentioned in the foregoing, the present invention can be applied to a content provider having access to multiple different media channels. In such a case, for each such main multimedia stream, at least one associated auxiliary stream comprising intra frames generated based on the same multimedia data as at least a portion of the inter frames in the respective main multimedia stream is multicast in parallel to the main streams. The stream information channel then preferably comprises information descriptive of time instances of intra frames for all main streams and their associated auxiliary streams. In an alternative approach several independent information channels, each serving one or more of the main streams, are multicast to the user terminals.

FIG. 8 is a flow diagram illustrating a multimedia session management method according to the present invention, relating to the operation of a user terminal. The method starts in step S40, which involves connecting to a stream information channel according to the present invention to receive information descriptive of time instance of intra frame transmissions in a multicast main multimedia stream and at least one associated multicast auxiliary stream. This channel connection can be performed in connection with setting up a multicast-based multimedia session, during such a multimedia session, e.g. at any time during the ongoing session or at specific time instances, including upon reception of a channel switch request.

Thus, in a first embodiment of the invention, a user terminal is connected to and listens to the stream information channel only in connection with selecting a multimedia channel or switching between channels. It is at those instances that it is important to receive a first intra frame of the channel as soon as possible to reduce the delay of the terminal decoder in processing the received media stream. Once the user terminal has used information received in the information channel it will then leave the channel. This embodiment can be useful if the information channel only comprises intra timing information relating to the multimedia channel the terminal is about to connect to.

In a second alternative embodiment, the user terminal is connected to the information channel throughout the whole multimedia session. However, the terminal will only used the information provided on the channel in connection with channel switches and set-ups. The amount of data transmitted on the information channel, channel identifiers and possible other data, such as synchronization data, is very low and does not require any extensive buffering or processing at the terminal. This embodiment is particularly advantageous if the information channel comprises intra timing information associated with multiple multimedia channels available at a given content provider or event from different such providers.

In either case, in a next step S41 the terminal selectively connects to the desired main multimedia stream or (one of) its associated auxiliary stream(s) based on the information descriptive of intra frame transmission time instances received on the information channel in step S40. The method then ends.

FIG. 9 is a flow diagram illustrating an embodiment of the selectively connecting step of FIG. 8 in more detail. The method continues from step S40. In a next step S50 a stream of the main stream and its auxiliary stream(s), in which a next intra frame is expected to arrive at the user terminal is identified based on the information retrieved from the stream information channel. Thus, the time instance descriptive information allows identification the stream that will carry a next intra frame.

The user terminal then connects and listens to the stream that is identified in step S50 to thereby receive an intra frame therefrom and start decoding and rendering multimedia data.

Thus, in this embodiment of the invention the user terminal identifies and connects to the stream of the main and auxiliary streams that will first provide a complete intra frame to the terminal. However, in an alternative embodiment, the user terminal must not necessarily connect to the multimedia stream carrying the first intra frame as determined based on the information in the stream information channel. For example, assume that a next intra frame will first be available from the auxiliary stream as determined based on the time instance information. However, the main multimedia stream will also carry an intra frame very shortly after the auxiliary stream, such as a few milliseconds after the auxiliary stream. In such a case, it might be most expedient to connect to the main stream even though that would result in an extra delay of a few milliseconds. The reason for this is that the user terminal then does not have to first join the auxiliary stream and then leave the auxiliary stream and join the main stream.

Thus, the user terminal must not necessarily have to, but preferably does, connect to the multimedia stream carrying the first intra frame. However, irrespective of which stream the terminal first joins, the choice is made at least partly dependent on the information provided by the stream information channel.

If the user terminal determines, based on the information from the stream information channel, that it should join the main multimedia stream, it compiles and transmits a joint request for that main multimedia stream, such as an IGMP join. If the terminal is currently listening to another media channel it simultaneously, or in a separate message, transmits a (IGMP) leave request for that other media channel.

If, however, the user terminal determines, based on the information from the stream information channel, that it should instead first join an auxiliary stream associated with the main stream carrying the media data of a desired channel, it compiles and transmits a (IGMP) joint request for the auxiliary stream. In addition, a (IGMP) leave request may be transmitted as previously described if the terminal is already listening to another media channel. Directly after receiving an intra frame of the auxiliary stream, or at least shortly thereafter, the user terminal switches from the auxiliary stream to the main multimedia stream. This is schematically illustrated in FIG. 9. In step S51, the user terminal generates and transmits a (IGMP) leave request relating to the auxiliary stream, i.e. preferably comprising an identifier of the auxiliary stream. Simultaneously, before or after generation and transmission of the leave request in step S51, the terminal compiles and transmits a (IGMP) join request for the associated main multimedia stream in step S52. The terminal then continues listening to the main stream S52 and receives and decodes inter and intra frames of that stream. As the terminal did successfully receive an intra frame before the auxiliary-to-main stream switch, it can now directly continue decoding and rending inter frames, possible after some buffering, of the main stream without having to wait for an intra frame in the main multimedia stream.

The stream information channel and the information transmitted on the channel may, in a particular embodiment, be a part of an electronic programming guide. This guide provides program information to users, usually in tabular form. It is well-known today that the program guide can be periodically loaded into the user terminal in a non-intrusive way. This means that the information descriptive of time instances of intra frames in main and associated auxiliary streams according to the present invention can then form a part of the program guide. However, in such a case the guide has to be updated so frequently that the user terminals can, at any time, retrieve information of intra frame time instances. It is possible that such timing information of the electronic programming guide is updated separately and more frequently than other information contained in the guide.

FIG. 10 is a schematic overview of a communication network or system 50 implementing the present invention. The network 50 is preferably able to provide the multimedia service, such as TV service, over an Internet Protocol network, typically a broadband access network. The network 50 could alternatively be a network for providing multimedia broadcast/multicast delivery methods for Mobile-TV. Examples of such standardisation efforts are 3GPP Multimedia Broadcast/Multicast Services (MBMS) and European Telecommunications Standards Institute (ETSI) Digital Video broadcasting-Handheld (DVB-H). These will be similar to traditional TV, in their broadcast distribution fashion.

In the following the present invention will be described and exemplified in more detail in connection with an IP network providing broadcast TV. However, the invention is not limited thereto but can apply to any network providing multimedia data in the form of multicast/broadcast transmissions to user terminals.

The network 50 comprises a multimedia (broadcast) feed or source 51 providing multimedia data to a super or IPTV head end 52 housing a multimedia provider 100 according to the present invention. The IPTV head end 52 is connected to a distribution router 53. This distribution router 53 is the core router or switch that generally sits at the head-end site and serves to deliver all the backend traffic to the service cloud, including all subscribed main multimedia streams, their associated auxiliary streams and the stream information channel (s) of the present invention.

The distribution router 53 is connected to one, or more often multiple, aggregation routers 54. The aggregation router 53 connects the digital subscriber line (DSL) access multiplexer (DSLAM) 55 with the distribution router. The DSLAM 55 delivers content from the network cloud to the subscribers at homer over DSL lines. The DSLAM 56 is the access node that is the last node in the operator's network 50. An optional residential gateway 56 provides a connecting pint between multiple set top boxes 200, i.e. user terminals, within a household and with the edge of the network 50. A set top box (STB) 200 is connected to the DSLAM 55, possibly through the residential gateway 56. This STB 200 is the direct interface to the user. The STB 200 comprises or is connected to a display screen 56, such as a TV on which the rendered multimedia will be displayed and played back. The STB 200 has an associated control 58, such as remote control 58, which is employed by a user for switching multimedia channels as described herein.

FIG. 11 is a schematic block diagram of a multimedia provider 100 according to the present invention. The provider 100 comprises a main multimedia stream provider 120 for providing at least one multimedia stream comprising intra and inter frames carrying multimedia data as previously described. This stream provider 120 can be in the form of a content engine or source that actually records and/or generates the media content. However, in a typical implementation, the stream provider 120 is adapted for receiving the multimedia data from an external source 51 and may optionally process it before transmission to subscribing users.

An auxiliary stream provider 130 is arranged in the multimedia provider 100 for generating, preferably for each main stream provided by the main multimedia stream provider 120, at least one associated auxiliary stream. This at least one auxiliary stream comprises intra frames, of which at least a portion are generated by the stream provider 130 based on same multimedia data as at least a portion of the inter frames of the associated multimedia stream.

The multimedia provider 100 also comprises an information channel provider 140 arranged for providing a stream information channel comprising information descriptive of time instances of intra frames in the main stream from the main stream provider 120 and in the auxiliary stream(s) from the auxiliary stream provider 130.

The multimedia data from the main 120 and auxiliary 130 stream providers is forwarded to a transmitter/receiver unit 110, schematically denoted to include the functionality generally associated with a transmitter chain and preferably also a receiver chain, such as, for example, modulator/demodulator, encoder/decoder, etc., which are well known in the art. The transmitter 110 multicasts or broadcasts the received multimedia data to subscribing users, typically by employing a set of routers or network nodes as schematically illustrated in FIG. 10. The transmitter also transmits the information of the stream information channel preferably as a multicast channel to the subscribing users.

In an embodiment, the main multimedia stream provider 120 receives the multimedia data of a given multimedia channel as uncoded data from a connected media source 51. In such a case, the stream provider 120 is arranged for generating the main multimedia stream by encoding the input multimedia data into intra frames and inter frames. The actual distribution of intra and inter frames can be pre-defined and fixed for the stream. Alternatively, the stream provider 120 receives input data descriptive of a current available bandwidth level. This data can be received by the receiver 110 and thereby estimated by some other unit in the network. Alternatively, the multimedia provider 100 can comprise a dedicated bandwidth measurer 160 that can be used for deriving estimates of a bandwidth level available for the multimedia channel. In such a case, the stream provider 120 uses these bandwidth level estimates in encoding to dynamically adjust the GOP length based on the estimates.

The input multimedia data is also forwarded to the auxiliary stream provider 130. The stream provider 130 generates the auxiliary stream by encoding selected portions of the multimedia data into intra frames. At least a portion of these selected portions corresponds to multimedia data that was encoded by the main stream provider 120 into P inter frames. An optional remaining portion can correspond to multimedia data that was encoded by the main stream provider 120 into intra frames.

The auxiliary stream provider 130 could employ a corresponding encoding quality as the main stream provider 120. However, in order to reduce the bandwidth utilization, the auxiliary stream provider 130 can encode multimedia data into intra frames using a comparatively lower encoding quality level. The actual (reduced) encoding quality could be fixed but is preferably dynamically adjusted to cope with changes in available bandwidth levels. For this purpose, the bandwidth measurer 160 may be used to at least estimate a bandwidth level available for a given multimedia channel. Alternatively, or in addition, such estimates can be determined by some other units and sent to the receiver 110. The bandwidth estimates are forwarded to a quality adjuster 170 that processes the input data to select an adapted encoding quality based on the input bandwidth estimates. This selected encoding quality level is employed by the auxiliary stream provider 130 when generating the intra frames.

The multimedia provider 100 may also comprise a GOP length estimator 150 connected to the main multimedia stream provider 120. This estimator 150 is arranged for estimating a current GOP length employed by the main multimedia stream provider 120 for generating the main stream. The determined length estimate is forwarded to the auxiliary stream provider 130.

FIG. 12 illustrates an embodiment of the auxiliary stream provider in more detail 130. The provider 130 comprises a data selector that preferably uses the GOP length estimate as basis for selecting portions of the multimedia data to encode, preferably at an encoding quality selected by the quality adjuster, into intra frames by an associated intra encoder 136.

In an alternative embodiment, the main multimedia stream provider 120 receives the multimedia data as a stream of intra and inter frames, i.e. already being in encoded form. In such a case, the auxiliary stream provider comprises a decoder 134 arranged for decoding portions of the main multimedia stream selected by the data selector 132 to form multimedia data. This decoded data is brought to the intra encoder 136 that re-encodes it into intra frames, possibly at an encoding quality selected by the quality adjuster. The portions selected by the data selector 132 preferably comprises at least some of the P inter frames of the main multimedia stream. The selection can also be made at least partly dependent on a GOP length of the main multimedia stream as previously described.

The units 132 to 136 of the auxiliary stream provider 130 may be implemented or provided as software, hardware or a combination thereof. The units 132 to 136 may all be implemented in the auxiliary stream provider 130. Alternatively, a distributed implementation is also possible and within the scope of the invention. In such a case, different units 132 to 136 of the auxiliary stream provider 130 may be arranged in the multimedia provider.

The multimedia provider 100 of FIG. 11 preferably also comprises a delay definer 180 arranged for selecting a suitable time delay of the main multimedia stream relative its associated auxiliary stream. The delay is preferably selected so that a P frame of the main stream is received by a user terminal after reception of an intra frame of the auxiliary stream, where the P frame and the intra frame are generated based on same multimedia data. Thus, the transmitter 110 is arranged for multicasting the main multimedia stream with a time delay from the delay definer 180 relative the multicast of the associated auxiliary stream.

It is anticipated by the present invention that the auxiliary stream provider 130 can generate multiple auxiliary streams associated with a same main multimedia stream as previously described. In addition, the main multimedia stream provider 120 can manage several main streams. The auxiliary stream provider 130 then preferably generates at least one auxiliary stream for each of the main streams. The channel provider 140 preferably includes intra frame timings regarding all main and auxiliary streams from the two stream providers 120, 130.

The units 110 to 180 of the multimedia provider 100 may be implemented or provided as software, hardware or a combination thereof. The units 110 to 180 may all be implemented in a single network node. Alternatively, a distributed implementation is also possible and within the scope of the invention. In such a case, different units 110 to 180 of the multimedia provider 100 may be arranged in different network nodes. In a preferred implementation, the multimedia provider is preferably arranged in a head-end node as illustrated in FIG. 10, or at least close to the head-end. However, the multimedia provider 100 could actually be arranged in any network node from the head-end down to the access node. However, the benefits of the present invention are largest if the provider 100 is situated at or close to the head-end.

FIG. 13 is a schematic block diagram of an embodiment of a user terminal, illustrated by a set top box 200 according to the present invention. The set top box 200 comprises a general transmitter/receiver unit 210. The receiver part of the unit 210 is in particular adapted for receiving multimedia data of a main multimedia stream or an auxiliary stream originating from a multimedia provider according to the present invention. The receiver 210 is also arranged for receiving data of an information stream channel.

The set top box 200 comprises an information channel connector 220 arranged for connecting to the stream information channel to allow the receiver 210 receiving the information descriptive of time instances of intra frame transmissions in a selected multicast main multimedia channel and at least one associated multicast auxiliary channel. The channel connector 220 preferably connects the set-top box to the information stream channel during the set-up of a multimedia session. The set top box 200 can then continuously listen to the information channel during the session. In an alternative approach, the information channel connector 220 only connects to the information channel in connection with session set-up and upon reception of a channel switch request from a general input and output (I/O) unit 260. In these cases, the set top box 200 disconnects the information channel following receiving the necessary information therefrom.

A preferred stream identifier 270 is arranged for processing the information received on the information stream channel. The stream identifier 270 uses the time instance descriptive information for determining in which of the main multimedia stream and its associated auxiliary stream(s) a next intra frame arrives. This information is provided to stream connector 230, which is arranged for selectively connecting to the main stream or one of its associated auxiliary streams based on the information carried by the stream information channel. More particularly, the stream connector 230 uses data from the stream identifier 270 for selecting the stream to first connect to following the set-up or following a channel switch request.

If the stream connector 230 selects, based on the information from the stream identifier 270, to first connect to an auxiliary stream, the receiver 210 receives at least one intra frame of that stream. Thereafter, the transmitter 210 transmits a leave request regarding the auxiliary stream and a join request regarding the associated main multimedia stream. For the continuing session (until session tear down or another channel switch), the receiver 210 receives data packets of inter and intra frames for the main multimedia stream.

The set top box 200 also comprises a data buffer 240 for temporarily storing received multimedia data to combat jitter imposed by the network. Once the amount of buffered data reaches a predefined threshold, a decoder 250 decodes the multimedia data in the buffer to form multimedia data that is transmitted by the I/O unit 260 for rendering to a user, e.g. displayed on a connected screen and/or played out at loudspeakers.

The I/O unit 260 preferably also receives channel requests, e.g. from a remote control or other connected user input. This request is processed by the set top box and a join request for a new multimedia channel is generated and transmitted by the transmitter 210.

The units 210, 220, 230, 250, 260 and 270 of the set top box 200 may be implemented or provided as software, hardware or a combination thereof.

The teachings of the present invention as described above and disclosed in FIG. 13 may also be applied to other types of user terminals and clients adapted for receiving and possibly rendering multimedia data in a multicast/broadcast network. Non-limiting further examples of such user terminals include mobile terminals, such as mobile telephones, personal digital assistants, lap tops with communication functionality, computers, etc.

It will be understood by a person skilled in the art that various modifications and changes may be made to the present invention without departure from the scope thereof, which is defined by the appended claims.

REFERENCES

[1] WO 00/70876
[2] US 2006/0140276
[3] WO 2006/057938
[4] J. M. Boyce and A. M. Tourapis, "Fast Efficient Channel Change", *Consumer Electronics, ICCE,* 2005 *Digest of Technical Papers*
[5] US 2006/0020995

The invention claimed is:

1. A multimedia providing unit comprising:
   a processor;
   a memory;
   a transmitter that multicasts, using the processor, a main multimedia stream comprising a mixture of intra frames and inter frames and that multicasts, using the processor, an associated auxiliary stream comprising intra frames, wherein at least a portion of said intra frames of said auxiliary stream are generated based on same multimedia data as at least a portion of said inter frames of said main multimedia stream, and wherein the intra frames of the auxiliary stream are encoded at a same quality level as the intra frames of the main multimedia stream;
   said transmitter multicasts, using the processor, said main multimedia stream with a defined time delay relative to said auxiliary stream; and
   a channel provider that provides, using the processor, a stream information channel comprising information descriptive of time instances of intra frames in said main multimedia stream and said auxiliary stream.

2. The multimedia providing unit according to claim 1, wherein said channel provider multicasts, using the processor, said stream information channel.

3. The multimedia providing unit according to claim 1, further comprising:
   a main stream generator that generates, using the processor, said main multimedia stream by encoding input multimedia data into said intra frames and said inter frames; and
   an auxiliary stream generator that generates, using the processor, said auxiliary stream by encoding selected portions of said input multimedia data into said intra frames.

4. The multimedia providing unit according to claim 3, wherein said auxiliary stream generator generates, using the processor, said auxiliary stream by encoding, into intra frames, portions of said input multimedia data that are encoded by said main stream generator into P inter frames of said main multimedia stream.

5. The multimedia providing unit according to claim 3, wherein said main stream generator generates, using the processor, said main multimedia stream by encoding, at a first quality level, input data into said intra frames and said inter frames, and said auxiliary stream generator generates, using the processor, said auxiliary stream by encoding, at a second quality level, said selected portions of said input multimedia data into said intra frames, where said second quality level being lower than said first quality level.

6. The multimedia providing unit according to claim 5, further comprising:
   a bandwidth measurer that measures, using the processor, a bandwidth level available for multicasting said main multimedia stream and said auxiliary stream; and
   a quality adjuster that adjusts, using the processor, said second quality level based on said bandwidth level measured by said bandwidth measurer.

7. The multimedia providing unit according to claim 3, further comprising:
   a group of pictures length estimator that estimates, using the processor, a group of pictures length for said main multimedia stream; and
   a data selector that selects, using the processor, portions of said input multimedia data based on said group of pictures length estimated by said group of picture length estimator, where said auxiliary stream generator generates said auxiliary stream by encoding, into said intra frames, said portions of said input multimedia data selected by said data selector.

8. The multimedia providing unit according to claim 1, further comprising:
   a decoder that decodes, using the processor, selected portions of said main multimedia stream to form multimedia data; and
   an intra frame encoder that generates, using the processor, said auxiliary stream by encoding said multimedia data into said intra frames.

9. The multimedia providing unit according to claim 8, wherein said decoder decodes, using the processor, selected P inter frames of said main multimedia stream to form said multimedia data.

10. The multimedia providing unit according to claim 8, further comprising:
   a group of pictures length estimator that estimates, using the processor, a group of pictures length for said main multimedia stream; and
   a data selector that selects, using the processor, portions of said main multimedia stream based on said group of pictures length estimated by said group of pictures length estimator, where said decoder decodes, using the processor, said portions of said main multimedia stream selected by said data selector.

11. The multimedia providing unit according to claim 1, further comprising a delay definer that defines, using the processor, said time delay so that a P inter frame of said main multimedia stream is received by a set top box after reception of an intra frame of said auxiliary stream, wherein said P inter frame and said intra frame being generated based on same multimedia data.

12. The multimedia providing unit according to claim 1, wherein:
   the main multimedia stream comprising a mixture of I intra frames and P and B inter frames; and
   the associated auxiliary stream comprising I intra frames, where at least a portion of said I intra frames of said auxiliary stream are generated based on same multimedia data as at least a portion of said P or B inter frames of said main multimedia stream.

13. The multimedia providing unit according to claim 1, wherein the stream information channel has identifiers so that a user terminal is able to discriminate between different main multimedia streams and also be able to determine to which main multimedia stream an auxiliary stream is associated.

14. A set top box comprising:
a processor;
a memory;
an information channel connector that connects to a stream information channel comprising information descriptive of time instances of intra frame transmissions in a multicast main multimedia stream comprising a mixture of intra frames and inter frames and an associated multicast auxiliary stream comprising intra frames, wherein at least a portion of said intra frames of said auxiliary stream are generated based on same multimedia data as at least a portion of said inter frames of said main multimedia stream, wherein the intra frames of the auxiliary stream are encoded at a same quality level as the intra frames of the main multimedia stream, and wherein said main multimedia stream has a defined time delay relative to said auxiliary stream; and
a stream connector that selectively connects to said main multimedia stream or said auxiliary stream based on said information descriptive of intra frame transmission time instances.

15. The set top box according to claim 14, further comprising a stream identifier that identifies, based on said information descriptive of intra frame transmission time instances, a stream of said main multimedia stream and said auxiliary stream in which a next intra frame arrives at said set top box, and said stream connector connects to said stream of said main multimedia stream and said auxiliary stream identified by said stream identifier.

16. The set top box according to claim 14, wherein said stream connector connects to said auxiliary stream as determined based on said information descriptive of intra frame transmission time instances, said set top box further comprising a transmitter that transmits a stream leave request regarding said auxiliary steam once a complete intra frame of said auxiliary stream has been received, and transmits a stream join request regarding said main multimedia stream once said complete intra frame of said auxiliary stream has been received.

17. The set top box according to claim 14, wherein:
the main multimedia stream comprising a mixture of I intra frames and P and B inter frames; and
the associated auxiliary stream comprising I intra frames, where at least a portion of said I intra frames of said auxiliary stream are generated based on same multimedia data as at least a portion of said P or B inter frames of said main multimedia stream.

18. The set top box according to claim 14, wherein the stream information channel has identifiers so that the set top box is able to discriminate between different main multimedia streams and also be able to determine to which main multimedia stream an auxiliary stream is associated.

19. A multimedia provision method implemented by a multimedia providing unit, the method comprising the steps of:
a) multicasting, by the multimedia providing unit, a main multimedia stream comprising a mixture of intra frames and inter frames;

b) multicasting, by the multimedia providing unit, an associated auxiliary stream comprising intra frames, wherein at least a portion of said intra frames of said auxiliary stream are generated based on same multimedia data as at least a portion of said inter frames of said main multimedia stream, wherein the intra frames of the auxiliary stream are encoded at a same quality level as the intra frames of the main multimedia stream, and wherein said multicasting step a) comprises multicasting said main multimedia stream with a defined time delay relative to multicasting said auxiliary stream; and
c) providing, by the multimedia providing unit, a stream information channel comprising information descriptive of time instances of intra frames in said main multimedia stream and said auxiliary stream.

20. The method according to claim 19, wherein said providing step comprises multicasting said stream information channel.

21. The method according to claim 19, further comprising the steps of:
d) generating said main multimedia stream by encoding input multimedia data into said intra frames and said inter frames; and
e) generating said auxiliary stream by encoding selected portions of said input multimedia data into said intra frames.

22. The method according to claim 21, wherein said generating step e) comprises generating said auxiliary stream by encoding, into intra frames, portions of said input multimedia data that are encoded into P inter frames of said main multimedia stream.

23. The method according to claim 21, wherein said generating step d) comprises generating said main multimedia stream by encoding, at a first quality level, input data into said intra frames and said inter frames, and said generating step e) comprises generating said auxiliary stream by encoding, at a second quality level, said selected portions of said input multimedia data into said intra frames, where said second quality level being lower than said first quality level.

24. The method according to claim 23, further comprising the steps of:
measuring a bandwidth level available for multicasting said main multimedia stream and said auxiliary stream; and
adjusting said second quality level based on said measured bandwidth level.

25. The method according to claim 21, wherein said generating step e) comprises the steps of:
estimating a group of pictures length for said main multimedia stream;
selecting portions of said input multimedia data based on said estimated group of pictures length; and
generating said auxiliary stream by encoding said selected portions of said input multimedia data into said intra frames.

26. The method according to claim 19, further comprising the steps of:
decoding selected portions of said main multimedia stream to form multimedia data; and
generating said first frame stream by encoding said multimedia data into said intra frames.

27. The method according to claim 26, wherein said decoding step comprises decoding selected P inter frames of said main multimedia stream to form multimedia data.

28. The method according to claim 26, wherein said decoding step comprises the steps of:

estimating a group of pictures length for said main multimedia stream;

selecting portions of said main multimedia stream based on said estimated group of pictures length; and decoding said selected portions of said main multimedia stream to form said multimedia data.

29. The method according to claim 19, further comprising defining said time delay so that a P inter frame of said main multimedia stream is received by a set top box after reception of an intra frame of said auxiliary stream, where said P inter frame and said intra frame being generated based on same multimedia data.

30. The method according to claim 19, wherein:

the main multimedia stream comprising a mixture of I intra frames and P and B inter frames; and the associated auxiliary stream comprising I intra frames, where at least a portion of said I intra frames of said auxiliary stream are generated based on same multimedia data as at least a portion of said P or B inter frames of said main multimedia stream.

31. The method according to claim 19, wherein the stream information channel has identifiers so that a user terminal is able to discriminate between different main multimedia streams and also be able to determine to which main multimedia stream an auxiliary stream is associated.

32. A multimedia session management method implemented by a set top box, the method comprising the steps of:

connecting, by the set top box, to a stream information channel comprising information descriptive of time instances of intra frame transmissions in a multicast main multimedia stream comprising a mixture of intra frames and inter frames and an associated multicast auxiliary stream comprising intra frames, wherein at least a portion of said intra frames of said auxiliary stream are generated based on same multimedia data as at least a portion of said inter frames of said main multimedia stream, wherein the intra frames of the auxiliary stream are encoded at a same quality level as the intra frames of the main multimedia stream, and wherein said main multimedia stream has a defined time delay relative to said auxiliary stream; and selectively connecting, by the set top box, to said main multimedia stream or said auxiliary stream based on said information descriptive of intra frame transmission time instances.

33. The method according to claim 32, wherein said selectively connecting step comprises the steps of:

identifying, based on said information descriptive of intra frame transmission time instances, a stream of said main multimedia stream and said auxiliary stream in which a next intra frame arrives at a set top box connected to said stream information channel; and connecting to said identified stream of said main multimedia stream and said auxiliary stream.

34. The method according to claim 32, wherein said selectively connecting step comprises connecting to said auxiliary stream as determined based on said information descriptive of intra frame transmission time instances, said method further comprising the steps of:

transmitting a stream leave request regarding said auxiliary stream once a complete intra frame of said auxiliary stream has been received; and transmitting a stream join request regarding said main multimedia stream once said complete intra frame of said auxiliary stream has been received.

35. The method according to claim 32, wherein:

the main multimedia stream comprising a mixture of I intra frames and P and B inter frames; and the associated auxiliary stream comprising I intra frames, where at least a portion of said I intra frames of said auxiliary stream are generated based on same multimedia data as at least a portion of said P or B inter frames of said main multimedia stream.

36. The method according to claim 32, wherein the stream information channel has identifiers so that the set top box is able to discriminate between different main multimedia streams and also be able to determine to which main multimedia stream an auxiliary stream is associated.

* * * * *